United States Patent Office 3,537,303
Patented Nov. 3, 1970

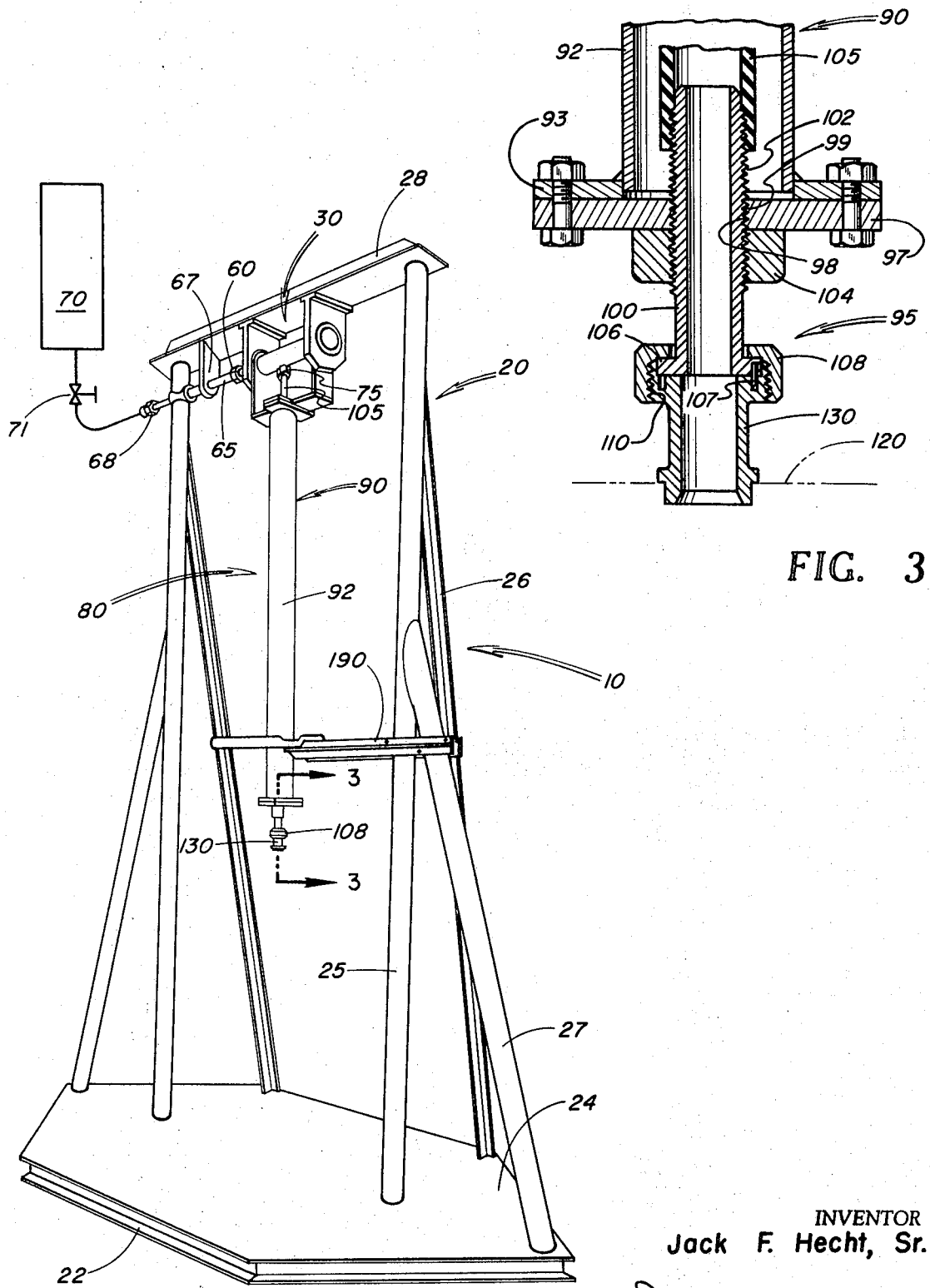

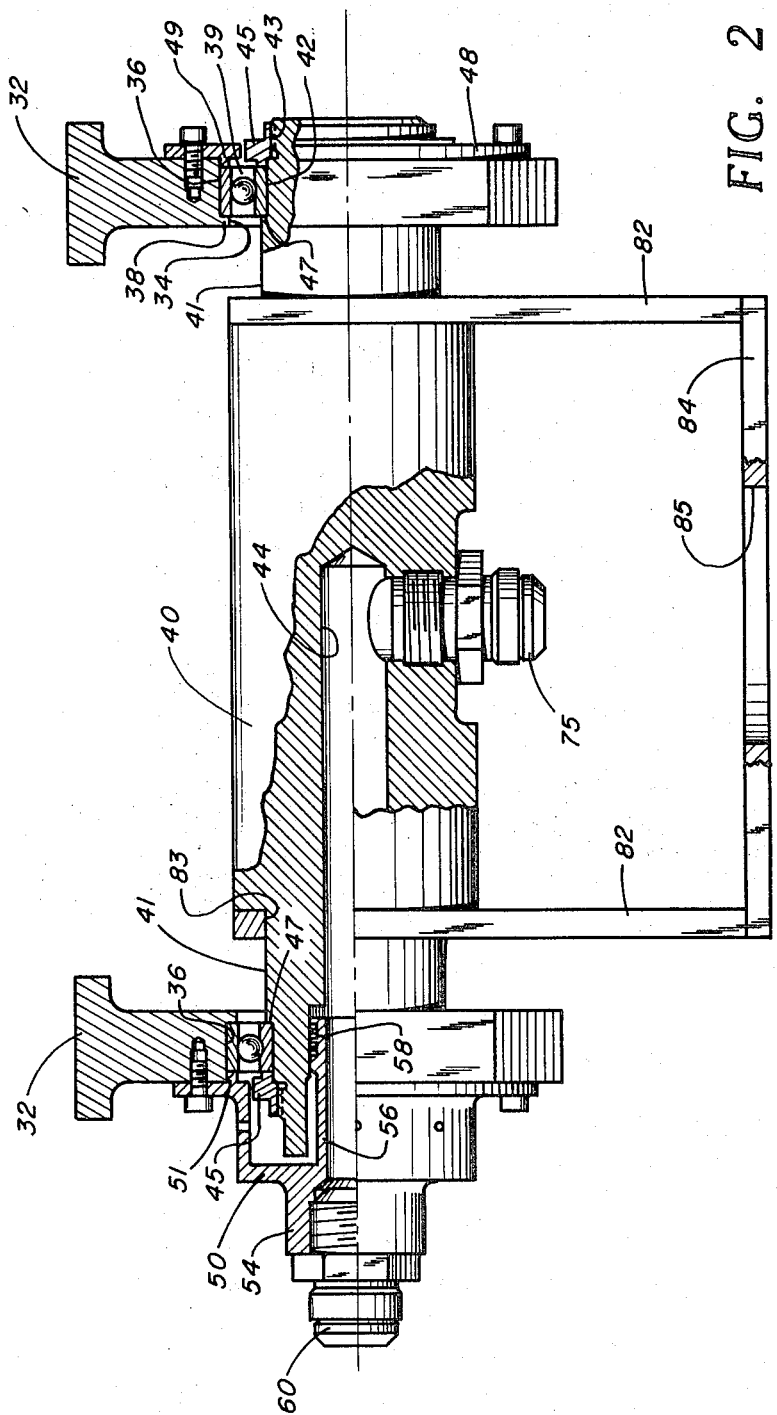

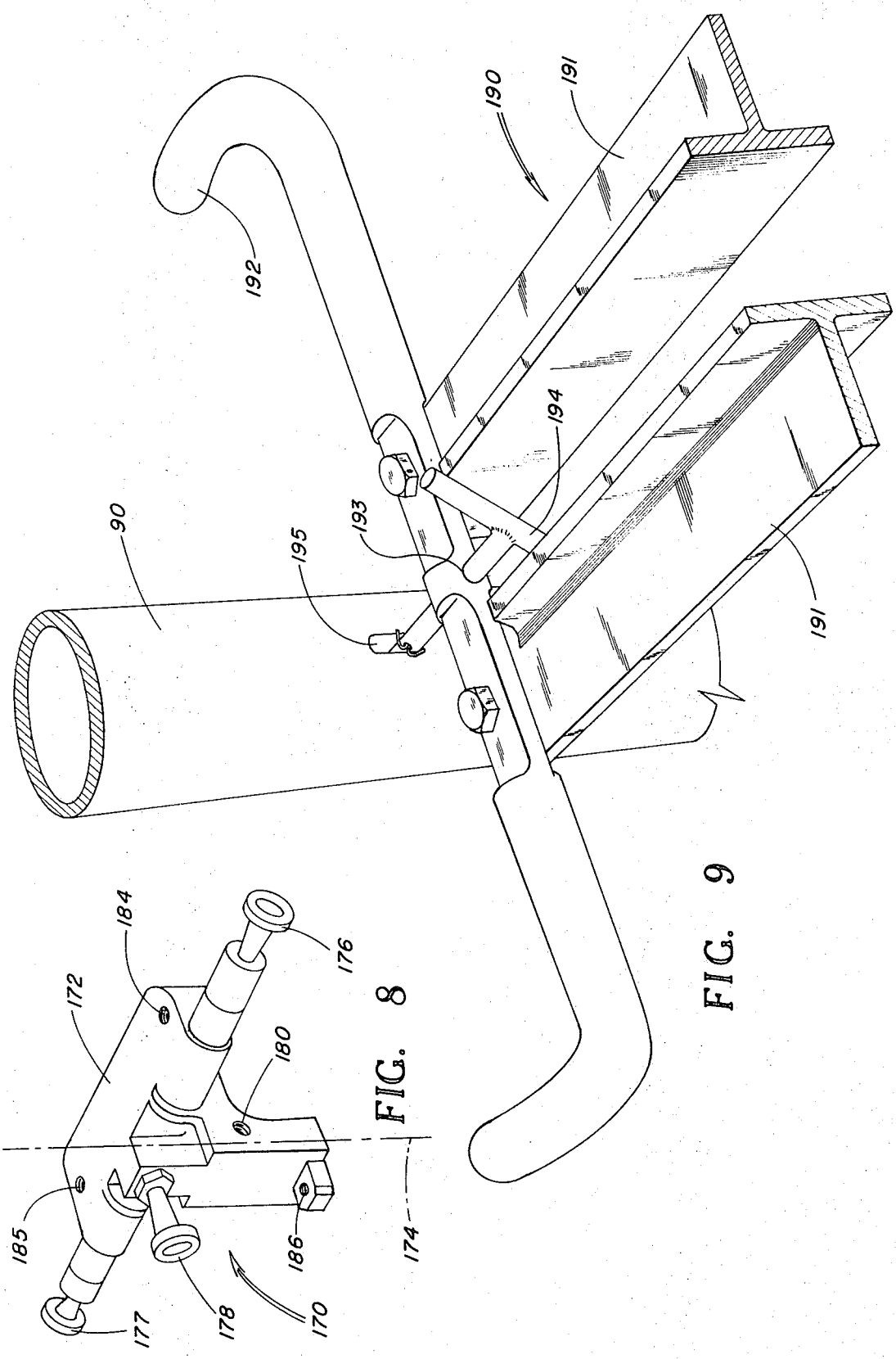

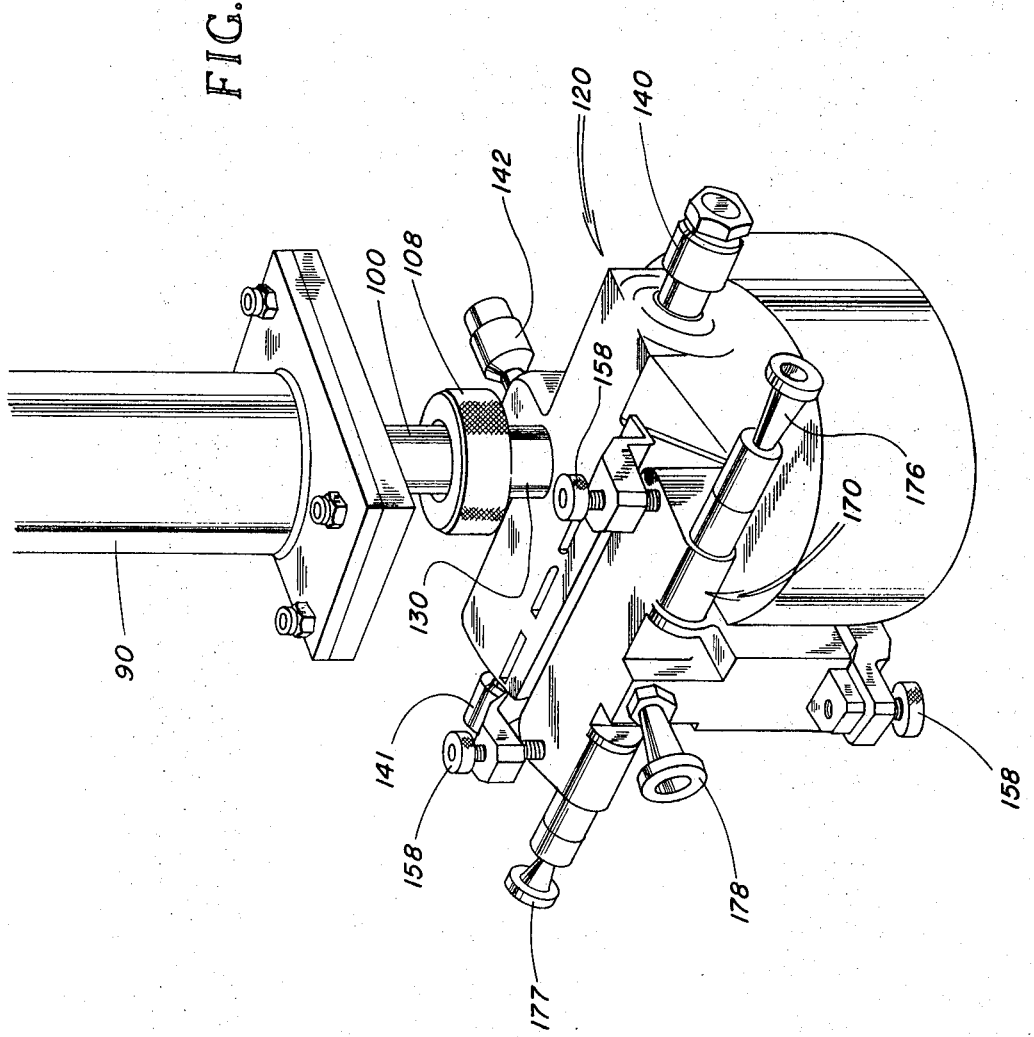

3,537,303
PENDULUM THRUST TEST STAND
Jack F. Hecht, Sr., Los Altos, Calif., assignor, by mesne assignments, to the United States of America as represented by the Secretary of the Navy
Filed Sept. 6, 1968, Ser. No. 757,871
Int. Cl. G01f 25/00
U.S. Cl. 73—117.4                                     12 Claims

ABSTRACT OF THE DISCLOSURE

An apparatus and method for determining if a thrust device utilizing a compressible fluid medium will produce a thrust force at a level falling between two previously established limits wherein a pendulum supports both the thrust device being tested and a master thrust assembly representing the previously established limits. A common gas source supplies both the thrust device being tested and the master assembly and the motion of the pendulum indicates acceptability or non-acceptability of the tested device.

BACKGROUND OF THE INVENTION

The present invention generally relates to thrust testing devices and more particularly to a pendulum-type thrust testing device and method.

The production of thrusting devices, such as cold and warm gas valves for use in sophisticated missiles, requires rigid standards of uniformity and assurance that the available thrust is within certain preestablished minimum and maximum thrust requirements under both adverse and optimum gas conditions, respectively. It has been discovered that thrust measurements are extremely difficult to determine with any degree of certainty since thrust measurements are presently made with load cells which are not only extremely sensitive to noise but also have been found to be of questionable repeatability to the required degree of accuracy. These thrust measurements further require the measurement of such parameters as gas temperature, gas flow, and gas pressure. Gas flow is probably one of the most difficult parameters to measure accurately since there are no primary standards for the measurement of gas weight flow. Gas flow rate itself is a calculated value obtained from measurements of pressure, temperature and a dubious knowledge of the specific heat ratio and gas constant of the gas. These parameters cannot be measured with normal test equipment, except crudely, and accuracy within one percent are obtainable only in the laboratory. Additional errors in thrust measurement occur due to intermediate calibrations, excitation power variations, and changes in environmental conditions between subsequent tests.

SUMMARY OF THE INVENTION

Accordingly, it is an object of the present invention to provide an improved pendulum-type device for testing a thrust device.

Another object of this invention is the provision of an accurate device for testing whether a thrust device falls within preestablished minimum and maximum standards of acceptable thrust.

Still another object of this invention is to provide a reliable device for testing and determining the acceptability of a thrust device which eliminates errors due to intermediate calibrations, excitation power variations and changes in environmental conditions.

A still further object of the present invention is to provide a device for testing the acceptability of a thrust device which test device eliminates the measurements of gas temperature, gas flow, and gas pressure.

An additional object of the present invention is the provision of a reliable, simple, accurate pendulum device for testing and determining whether a thrust device utilizing a compressible fluid medium will produce a thrust force level falling between two previously established limits.

A further object of the present invention is to provide a method for testing whether a thrust device falls within preestablished minimum and maximum standards of acceptable thrust.

A still further object of this invention is to provide a reliable method for testing and determining the acceptability of a thrust device which eliminates errors due to intermediate calibrations, excitation power variations and changes in environmental conditions.

Another object of the present invention is to provide a method of testing the acceptability of a thrust device which method eliminates the measurements of gas temperature, gas flow, and gas pressure.

An additional object of the present invention is the provision of a reliable, simple, accurate method for testing and determining whether a thrust device utilizing a compressible fluid medium will produce a thrust force level falling between two previously established limits.

According to the present invention, the foregoing and other objects are attained by a testing device and method having a pendulum supporting both the thrust device being tested and a master thrust assembly or standard representing the previously established limits. A common gas source simultaneously supplies both the thrust device being tested and the master assembly and the motion of the pendulum indicates acceptability or non-acceptability of the tested device.

DESCRIPTION OF THE DRAWING

A more complete appreciation of the invention and many of the attendant advantages thereof will be readily appreciated as the same becomes better understood by reference to the following detailed description when considered in connection with the accompanying drawings wherein:

FIG. 1 is a perspective view of the pendulum test stand with certain parts removed for purposes of clarity;

FIG. 2 is a detailed view in elevation of the air bearing assembly forming part of the pendulum test stand;

FIG. 3 is a detailed cross-sectional view taken along line 3—3 of FIG. 1;

FIG. 8 is a perspective view of the thrust device, the device to be tested; and

FIG. 9 is a detailed perspective view of the pendulum arm clamp assembly of FIG. 1;

FIG. 10 is a perspective view of the null fixture and the thrust device connected thereto depending from the pendulum arm.

DESCRIPTION OF THE PREFERRED EMBODIMENT

Figure 4:
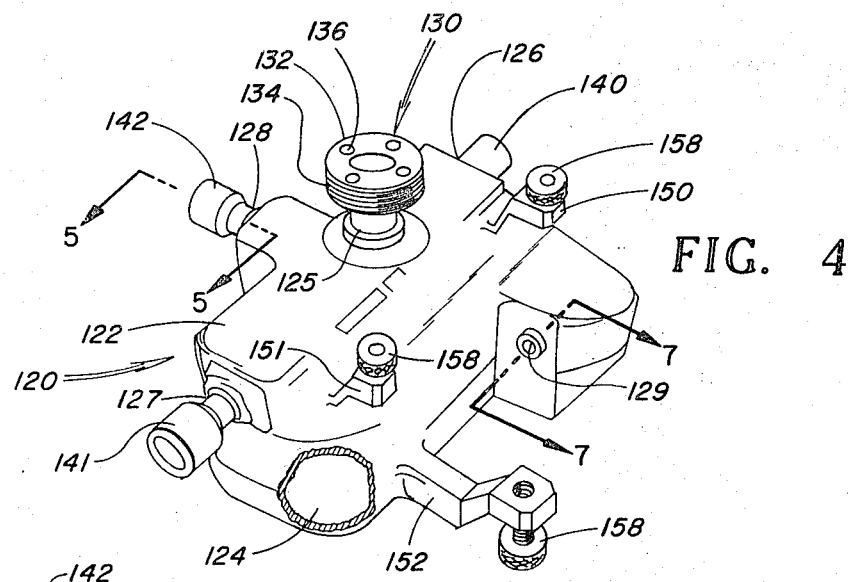
FIG. 4 is a perspective view of the thrust valve mounting and null fixture with parts removed for purposes of clarity.

Referring now to the drawings wherein like reference characters designate identical or corresponding parts throughout the several views, and more particularly to FIG. 1 thereof, the pendulum thrust test stand apparatus illustrated generally at 10 is shown as consisting essentially of a frame 20, a pendulum arm bearing assembly 30, and a pendulum system 80 for supporting the device to be tested. In particular, the frame 20 includes a plurality of structural beams, such as I-beams 22 fastened together as by welding or the like to form a hexagonal base 24. Parallel, spaced columns 25 extend upwardly from the base 24 and are provided with the requisite strength and rigidity by back braces 26 and side braces 27 appropriately fastened thereto. A strut, such as T-beam 28, is mounted at the upper ends of the columns 25 to provide the supporting structure for the bearing assembly 30, now to be described.

Referring to FIGS. 1 and 2, the strut 28 has fastened thereto, as by bolting or the like, a pair of depending, spaced and parallel mounting plates 32, each having an annular bore 34 therethrough and counterbored at 36 to form an annular flange 38. A ball bearing assembly 39 is press fitted into the counterbore 36 of each plate 32 with the outside race abutting the annular flanges 38. A center hollow shaft or manifold 40 having a series of reduced diameter sections 41, 42 and 43 at the extremities thereof and a central hollow chamber 44 is press fitted at reduced diameter section 42 into the inside bearing race of each bearing assembly 39. To secure the ball bearing assemblies 39 in place, the reduced diameter sections 43 threadably receive bearing nuts 45 which urge the inside bearing races into abutting engagement with shoulders 47 formed between the reduced diameter sections 41 and 42. A retaining ring 48 having a flange 49 abutting the outside bearing race of assembly 39 is bolted or otherwise fastened to one of the plates 32 to urge the bearing race in engagement with the flange 38 of the plate 32. A housing generally indicated at 50 is bolted to the other plate 32 and includes a flange 51 for abutting the outside bearing race of the assembly 39 associated with plate 32. Housing 50 is formed with an outwardly extending hollow tubular portion 54 and an inwardly extending hollow tubular portion 56 communicating with tube 54 and externally ribbed at 58 to form a seal with the interior of manifold 40 at a position radially of one of the reduced diameter sections 42. Tube 56, in turn, has fluid communication with the hollow portion of manifold 40.

Again referring ot FIGS. 1 and 2 a union 60 is fitted at one end to the outwardly extending tube 54 and a hose 65 is connected to the other end of the union. The hose 65 is supported by a bracket 67, passing through column 25 and is attached through a union 68 to a pressurized source of gas 70, such as nitrogen or the like which will cause the device to be tested to provide a thrust force substantially equivalent to operational conditions. A valve 71 selectively opens or closes the manifold 40 of the stand 10 to the source of nitrogen 70. A second union 75 is secured to the manifold 40 and provides the fluid communication link between the hollow chamber 44 thereof and the pendulum system 80, now to be described.

As more clearly shown in FIGS. 1, 2 and 3 the pendulum system 80 includes a pair of parallel side plates 82 which are bored at 83 to receive and surround the manifold 40 at reduced section 41 and which are rigidly secured thereto as by welding or the like. A base plate 84 rigidly fastened to plate 82 has formed therein an aperture 85 which is in alignment with the union 75 and serves as support for a pendulum arm 90. Arm 90 is formed of an elongated tube 92 having flange plates 93 securely attached at each extremity thereof as by welding or the like. One of the flange plates 93 is connected to the base plate 84 as by bolting, to rigidly secure the arm 90 to the manifold 40 for rotative movement therewith while the other flange plate 93 has a coupling assembly generally indicated at 95 fastened thereto. The assembly 95 includes a platform 97 bolted or otherwise connected to the other flange plate 93 and formed with an aperture 98 therethrough which is threaded at 99 to receive a hollow adapter 100 externally threaded at 102. A nut 104 engages the hollow adapter 100 and maintains the latter in a fixed position relative to the platform 97. A hose 105 coupled to the second union 75 extends downwardly through the tube 92 and is joined to the hollow adapter 100 to provide fluid communication from the manifold 40 to the hollow adapter 100. The adapter 100 terminates in a circular flange 106 which is bored or otherwise formed to rigidly secure an indexing pin 107 thereto by press fitting or the like. A collar nut 108 encompasses the flange 106 and pin 107 and includes an internally threaded portion 110 for coupling the assembly 95 to a thrust valve mounting and null fixture indicated generally at 120.

As more clearly shown in reference to FIGS. 3 and 4, fixture 120 includes a housing 122 having an internal plenum chamber 124 and a series of apertures 125, 126, 127, 128 and 129 formed in the walls thereof for providing fluid communication between the plenum chamber 124 and the exterior of housing 122. Chamber 124 is in fluid communication with hose 105 through a coupling port 130 of hollow cylindrical configuration which is welded or otherwise secured to the housing 122 at aperture 125. At the extremity thereof coupling port 130 is fashioned with an annular flange 132 which is externally threaded at 134 to receive the internally threaded portion 110 of collar nut 108. A series of bores 136 spaced at 90° intervals about flange 132 are configured to selectively receive the indexing pin 107 attached to flange 106 for properly orienting and positioning the fixture 120 with respect to the remaining elements of the apparatus 10.

While aperture 125 and its associated port 130 are on the top part of the housing 122 for providing access to the internal plenum chamber 124, apertures 126, 127 and 128 are formed on three sides of the housing 122 with apertures 126 and 127 in substantial alignment and aperture 128 in transverse relationship thereto. These apertures 126, 127 and 128 are fitted with exit ports of similar configuration 140, 141 and 142, respectively, which are attached to the housing 122 by welding or the like and of hollow cylindrical configuration.

Figure 5:
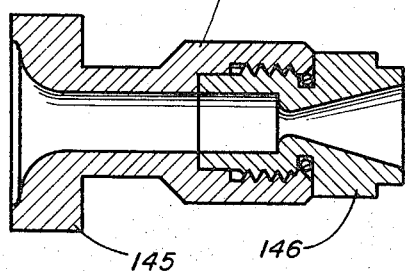
FIG. 5 is a detailed cross-sectional view taken along line 5—5 of FIG. 4.
Figure 6:
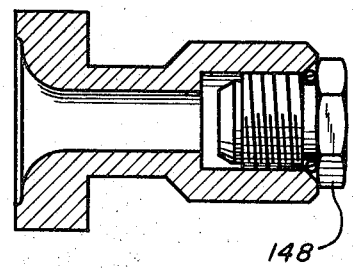
FIG. 6 is a detailed cross-sectional view similar to FIG. 5 with a nozzle plug replacing the master nozzle.

As more clearly seen in FIG. 5, the ports are internally threaded as at 145 to selectively receive either one of a series of master nozzles 146 or, as shown in FIG. 6, a nozzle plug 148 when the port is not being used. Master nozzles 146 are nozzles which have been extensively tested such that the thrust characteristics thereof are known and which provide a standard against which the device to be tested can be compared. For example, if it is desired to determine whether the thrust of the device to be tested is within preestablished acceptable limits then a master nozzle 146 representative of the maximum acceptable thrust level is selected and threaded into a particular port and the test conducted as described hereinafter. Thereafter, the master nozzle 146 is replaced in the particular port by a master nozzle representative of the minimum acceptable thrust valve and the test again conducted.

As will be more fully explained hereinafter, the location, number, and position of the apertures and their associated exit ports are determined by the physical configuration of the item to be tested.

Again with reference to FIG. 4, the housing 122 has a triangularly spaced series of supporting members 150, 151, and 152 extending therefrom for securing the device to be tested to the fixture 120. Each of support members 150, 151 and 152 is bored therethrough and receives threaded fastener 158.

Figure 7:
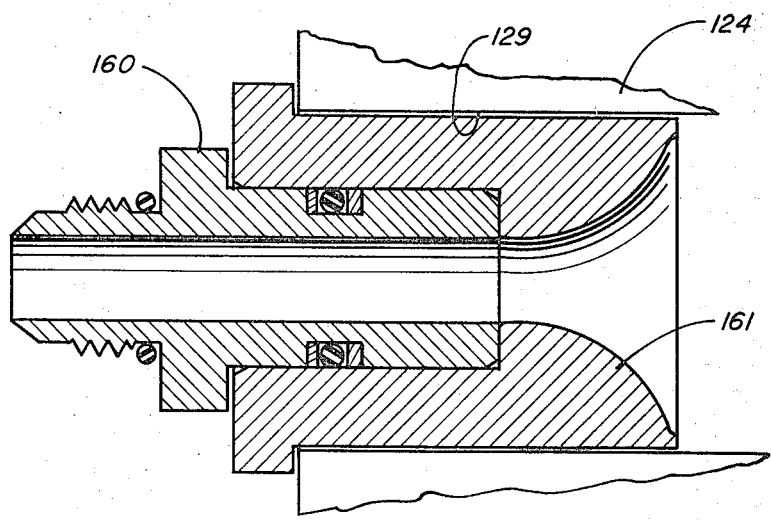
FIG. 7 is a detailed cross-sectional view taken along the line 7—7 of FIG. 4 including a fluid coupling.

As more clearly shown in FIGS. 4 and 7, the aperture 129 is in fluid communication with the chamber 124 and has a fluid coupling 160 attached to an exit port 161 at aperture 129 for insertion within a thrust device or nozzle assembly 170, the device to be tested. Although the nozzle assembly 170 to be described hereinafter is of a particular structural configuration, it should be understood that thrust devices other than that specifically disclosed herein may be used without departing from the scope of the present invention. More particularly, and with reference to FIGS. 8 and 10, nozzle assembly 170 includes a body 172 having a longitudinal axis 174 and three nozzles 176, 177 and 178 positioned transverse to axis 174 with nozzles 176 and 177 in alignment but facing in opposite directions. It may be observed that each nozzle 176, 177 and 178 has an opposite port 141, 140 and 142, respectively on the fixture 120 against which the nozzles are tested when such ports are fitted with master nozzles 146. In order to admit fluid pressure to the nozzle assembly 170 the body 172 is bored at 180 to receive the fluid coupling 160 when the assembly 170 is positioned on the fixture 120. To secure the assembly 170 to the fixture 120 the body 172 is bored and threaded at 184, 185 and 186 to threadably receive the complementary threaded fastener 158 attached to the supporting members 150, 151 and 152, respectively.

As viewed in FIGS. 1 and 9, the pendulum arm 90 is selectively prevented from swinging about its support by an arm clamp assembly generally indicated at 190. Assembly 190 includes a pair of spaced, parallel T-bars 191 bolted or otherwise connected to both column 25 and the side brace 27 and extending toward the pendulum arm 90. T-bars 191 terminate at adjacent arm 90 and have a horizontally extending stop arm 192 bolted adjacent the midpoint thereof to the extremities of T-bars 191. Stop arm 192 is curved outwardly at its ends to limit the swinging distance of pendulum arm 90 and includes a hole 193 at its midpoint and intermediate the T-beams 191 to retractably receive a locking pin 194. A slot 195 is formed in pendulum arm 90 for receiving the locking pin 194 when the arm 90 is at its rest or neutral position. Although not shown, it is to be understood that the stop arm 192 may be cushioned to mitigate shock and damage to arm 90 when the latter comes into engagement with stop arm 192.

In operation, the pendulum arm 90 is locked in a fixed position by inserting locking pin 194 into the slot 195 formed in the pendulum arm 90. Nozzle assembly 170, the device to be tested, is then secured to the housing 122 by threading fasteners 158 attached to supporting members 150, 151 and 152 into the threaded bores in the nozzle assembly 170 and inserting the fluid coupling 160 attached to the housing 122 into the bore 180 in body 172. In this relationship, each nozzle 176, 177 and 178 in the assembly 170 has an oppositely facing exit port 141, 140 and 142, respectively. To test the acceptability of nozzle 176, the collar nut 108 is loosened and the combination of fixture 120 and nozzle assembly 170 rotated until the indexing pin 107 fits into the appropriate bore 136 in coupling port 130 and the nozzle 176 points forwardly and parallel to the swing plane of the pendulum arm 90. A master nozzle 146 representative of the minimum acceptable thrust is screwed into exit port 141 which is directly opposite and on the same radius as nozzle 176. All remaining nozzles and exit ports 140 and 142 are plugged to preclude any thrust therefrom. Valve 71 is then opened and nitrogen from source 70 is applied to the pendulum thrust test stand 10. The nitrogen passes via hose 65 to manifold 40 and through hose 105 and adapter 100 to the housing 122. Locking pin 194 is removed from its engagement within slot 195 and the pendulum arm 90 allowed to swing in the direction of greater thrust. If the thrust from the nozzle assembly 170 is greater than the thrust from the low limit master nozzle the pendulum arm 90 would move against the master nozzle 146. This test will serve to prove that the thrust available at nozzle 176 of the nozzle assembly 170 is equal or greater than the minimum acceptable thrust.

The low thrust limit master nozzle is then replaced by a high thrust limit master nozzle representative of the maximum acceptable thrust and the test repeated. If the thrust from the high thrust limit master nozzle is greater than the thrust of the nozzle 176 of nozzle assembly 170 the pendulum arm 90 moves against the nozzle assembly 170. This test will prove that the thrust available from nozzle 176 is about as equal to or less than the maximum acceptable thrust. Thus, by the use of a set of high and low thrust limit master nozzles mounted on a pendulum working against the test article 170, the maximum and minimum acceptable thrust deviation from the nozzle assembly 170 can be determined.

In a similar manner, each of the nozzles 177 and 178 can be positioned parallel to the pendulum arm swing axis and master nozzles inserted in the opposite exit ports 140 and 142, respectively, and each of these nozzles 177 and 178 can be tested against the high and low thrust limit master nozzles screwed therein.

By reason of this arrangement a thrust device can be tested to determine accurately whether the thrust available is within the preset and previously established limits. In view of the fact that no calculations are required and that environmental conditions affect both the device being tested and the master assembly a high degree of accuracy is obtained.

Obviously, numerous modifications and variations of the present invention are possible in the light of the above teachings. It is therefore to be understood that within the scope of the appended claims the invention may be practiced otherwise than as specifically described herein.

What is claimed as new and desired to be secured by Letters Patent of the United States is:

1. An apparatus for measuring thrust by the observation of pendulum movement caused by differential thrust output between a test nozzle and a master nozzle comprising:
   a support having spaced bearings therein;
   a manifold rotatably supported in said bearings and having means thereon for connecting said manifold to a pressure source;
   a pendulum arm attached to said manifold movement in a swing plane normal to said manifold and having fluid communication therewith;
   a plenum chamber secured to said pendulum arm and in fluid communication therewith;
   means for connecting the test nozzle to said plenum chamber at a fixed radial distance from said manifold;
   means connecting the master nozzle of known thrust characteristics to said plenum chamber directly opposite the test nozzle and at the same radial distance from said manifold whereby the pendulum arm swings in the direction of greater thrust when pressure is admitted to the manifold and indicates the relative relationship of the thrust characteristic of the test nozzle and the master nozzle.

2. The apparatus defined in claim 1 wherein said plenum chamber includes a nozzle port for removable installation of the master nozzle.

3. The apparatus defined in claim 2 wherein the master nozzle installed in said port has a thrust characteristic representative of the minimum acceptable thrust, whereby when the pressure is admitted to the manifold the pendulum arm swings against the master nozzle if the test nozzle thrust is greater than the minimum permissible thrust.

4. The apparatus defined in claim 2 wherein the master nozzle installed in said port has a thrust characteristic representative of the maximum acceptable thrust, whereby when the pressure is admitted to the manifold the pendulum arm swings against the test nozzle if the test nozzle thrust is less than the maximum permissible thrust.

5. The apparatus of claim 1 wherein said means for connecting the test nozzle to said plenum chamber includes means for mounting a plurality of test nozzles thereon;
   a corresponding plurality of master nozzles of known thrust characteristics each mounted on said plenum chamber opposite one of said test nozzles and at the same radial distance from said manifold as the corresponding test nozzle;
   means connecting said plenum chamber to said pendulum arm for selectively positioning one of the test nozzles and the corresponding master nozzle parallel to said swing plane of said pendulum;

and means for closing the other of the test nozzles and their corresponding master nozzles.

6. The apparatus of claim 5 wherein said plenum chamber includes a nozzle port for removable installation of the selected master nozzle.

7. The apparatus defined in claim 6 wherein the selected master nozzle installed in said nozzle port has a thrust characteristic representative of the minimum acceptable thrust, whereby when the pressure is admitted to the manifold the pendulum arm swings against the selected master nozzle if the test nozzle thrust is greater than the minimum permissible thrust.

8. The apparatus defined in claim 6 wherein the selected master nozzle installed in said port has a thrust characteristic representative of the maximum acceptable thrust, whereby when the pressure is admitted to the manifold the pendulum arm swings against the selected test nozzle if the test nozzle thrust is less than the maximum permissible thrust.

9. A method for determining the thrust characteristic of a test nozzle comprising the steps of:

mounting a test nozzle for substantially free rotative movement about a fixed axis and at a fixed radial distance therefrom;

mounting a master nozzle of known thrust characteristic opposite to said test nozzle and at the same radial distance from said fixed axis as said test nozzle;

applying pressure equally and simultaneously to both said test nozzle and said master nozzle; whereby movement of said nozzles indicates the relative relationship of the thrust characteristic of the test nozzle and the master nozzle.

10. An apparatus for measuring thrust by the observation of pendulum movement caused by differential thrust output between a test nozzle and a master nozzle comprising:

support means including means for pivoting;

a pendulum assembly rotatably supported by said pivot means for swingable movement in a plane;

means for connecting the test nozzle to said pendulum assembly at a fixed radial distance from said pivot means;

means for connecting the master nozzle of known thrust characteristics to said pendulum assembly directly opposite the test nozzle at said fixed radial distance from said pivot means to enable the pendulum arm to swing in the direction of greater thrust when pressure is admitted thereby to indicate the relative relationship of the thrust characteristic of the test nozzle and the master nozzle and means adapted to connect said nozzles in fluid communication with a source of pressure.

11. The apparatus defined in claim 2 wherein said master nozzle installed in said port has a thrust characteristic representative of either the minimum acceptable thrust, whereby when pressure is admitted to the manifold the pendulum arm swings against the master nozzle if the test nozzle thrust is greater than the minimum permissible thrust, or the maximum acceptable thrust, whereby when pressure is admitted to the manifold the pendulum arm swings against the test nozzle if the test nozzle thrust is less than the maximum permissible thrust.

12. A method for determining the thrust characteristic of a test nozzle comprising the steps of:

mounting a test nozzle for substantially free rotative movement about a fixed axis and at a fixed distance therefrom;

mounting a first master nozzle, having a thrust characteristic representative of a minimum acceptable thrust opposite to said test nozzle and at the same radial distance from said fixed axis as said test nozzle;

applying pressure equally and simultaneously to both said test nozzle and said first master nozzle whereby movement of said nozzles toward said first master nozzle indicates an acceptable minimum thrust characteristic of the test nozzle;

removing said first master nozzle and mounting a second master nozzle having a thrust characteristic representative of a maximum acceptable thrust, opposite to said test nozzle and at the same radial distance from said fixed axis as said test nozzle;

reapplying pressure equally and simultaneously to both said test nozzle and said second master nozzle whereby movement of said nozzles away from said second master nozzle indicates an acceptable maximum thrust characteristic of the test nozzle.

References Cited
UNITED STATES PATENTS 2,790,320  4/1957  Salko et al. _____ 73—3

JERRY W. MYRACLE, Primary Examiner

U.S. Cl. X.R.

73—3, 49.7